United States Patent [19]
Townsend

[11] Patent Number: 5,992,190
[45] Date of Patent: Nov. 30, 1999

[54] VEHICLE ANTI-THEFT STEERING WHEEL LOCKING MECHANISM

[76] Inventor: Walter C. Townsend, 2716 N. 9th St., Milwaukee, Wis. 53206

[21] Appl. No.: 08/891,729

[22] Filed: Jul. 14, 1997

Related U.S. Application Data

[60] Division of application No. 08/610,157, Feb. 29, 1996, which is a continuation-in-part of application No. 08/419,336, Apr. 10, 1995, abandoned.

[51] Int. Cl.$^6$ .................................................. B60R 25/02
[52] U.S. Cl. .............................................. 70/209; 70/226
[58] Field of Search ........................... 70/207, 209, 211, 70/212, 225, 226, 237, 238; 74/558, 558.5

[56] References Cited

U.S. PATENT DOCUMENTS

| | | | |
|---|---|---|---|
| 1,329,913 | 2/1920 | McGuire . | |
| 4,008,590 | 2/1977 | Berkowitz et al. | 70/424 |
| 4,304,110 | 12/1981 | Fain | 70/209 |
| 4,304,111 | 12/1981 | Nolin | 70/212 |
| 5,199,284 | 4/1993 | Lin | 70/209 |
| 5,239,849 | 8/1993 | Gallardo | 70/209 |
| 5,275,030 | 1/1994 | Cole | 70/209 |
| 5,297,406 | 3/1994 | Lin | 70/238 X |
| 5,415,018 | 5/1995 | Ferrante | 70/209 |
| 5,454,240 | 10/1995 | Whitney | 70/209 |
| 5,555,753 | 9/1996 | Matlock | 70/209 |
| 5,613,383 | 3/1997 | Banez | 70/226 X |
| 5,613,384 | 3/1997 | Weber et al. | 70/209 |
| 5,676,001 | 10/1997 | Ho | 70/209 |
| 5,735,149 | 4/1998 | Winner, Jr. | 70/209 |

*Primary Examiner*—Lloyd A. Gall
*Attorney, Agent, or Firm*—Ryan Kromholz & Manion, S.C.

[57] ABSTRACT

The invention is a device for inhibiting the rim of a vehicle steering wheel from movement thereby rendering the vehicle inoperable. The invention is comprised of first and second semicircular casings wherein each casing has an inwardly curving lip disposed around the circular portion of its periphery. Each casing is designed to fit over a portion of the vehicle steering wheel such that when so disposed, the first and second semicircular casings can be secured together to completely encase the rim of the vehicle steering wheel. When secured around the rim of the vehicle steering wheel in this manner, casings prevent any portion of the rim from being broken or cut. Additionally, a radial bar is attached to the outer surface of one of the casings wherein the bar extends beyond the periphery of the steering wheel to prevent substantial rotation of the steering wheel. The bar is also used to join the first and second casings. A locking mechanism is utilized to secure the first and second semicircular casing to one another to prevent removal of the invention from the vehicle steering wheel. In additional embodiments, hook members are located within the semicircular casings. The hook members engage the rim of the steering wheel such that portions of the steering wheel are fully encapsulated about the steering wheel's "periphery". The hook structures retract before the device is removed from the steering wheel by the user.

4 Claims, 7 Drawing Sheets

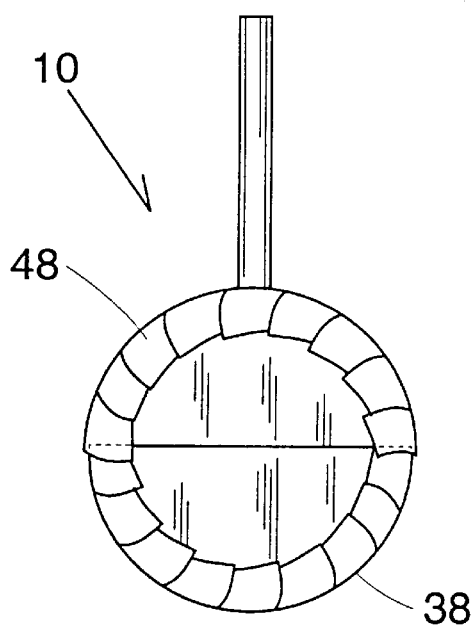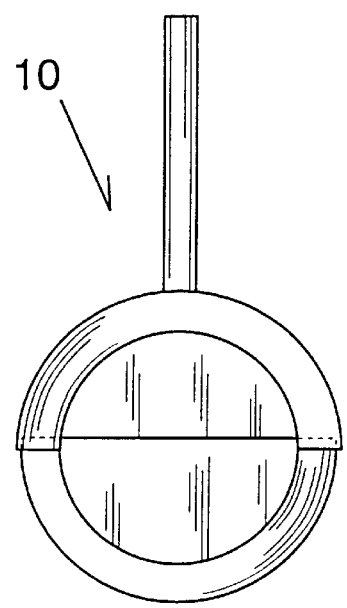
FIG. 4    FIG. 5
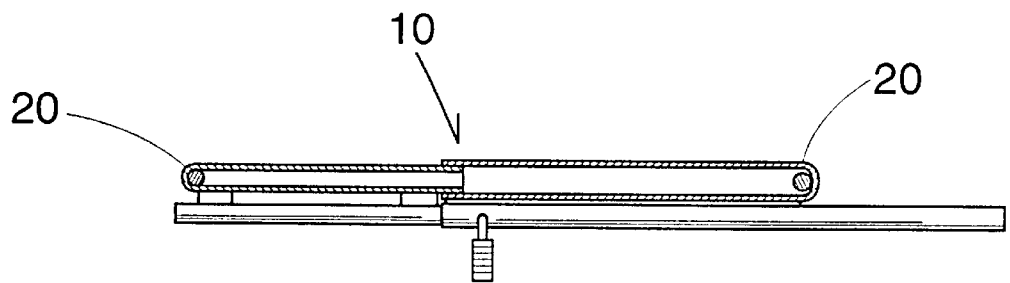
FIG. 6
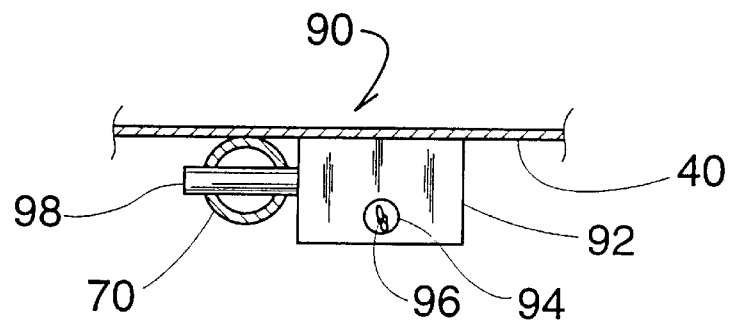
FIG. 7

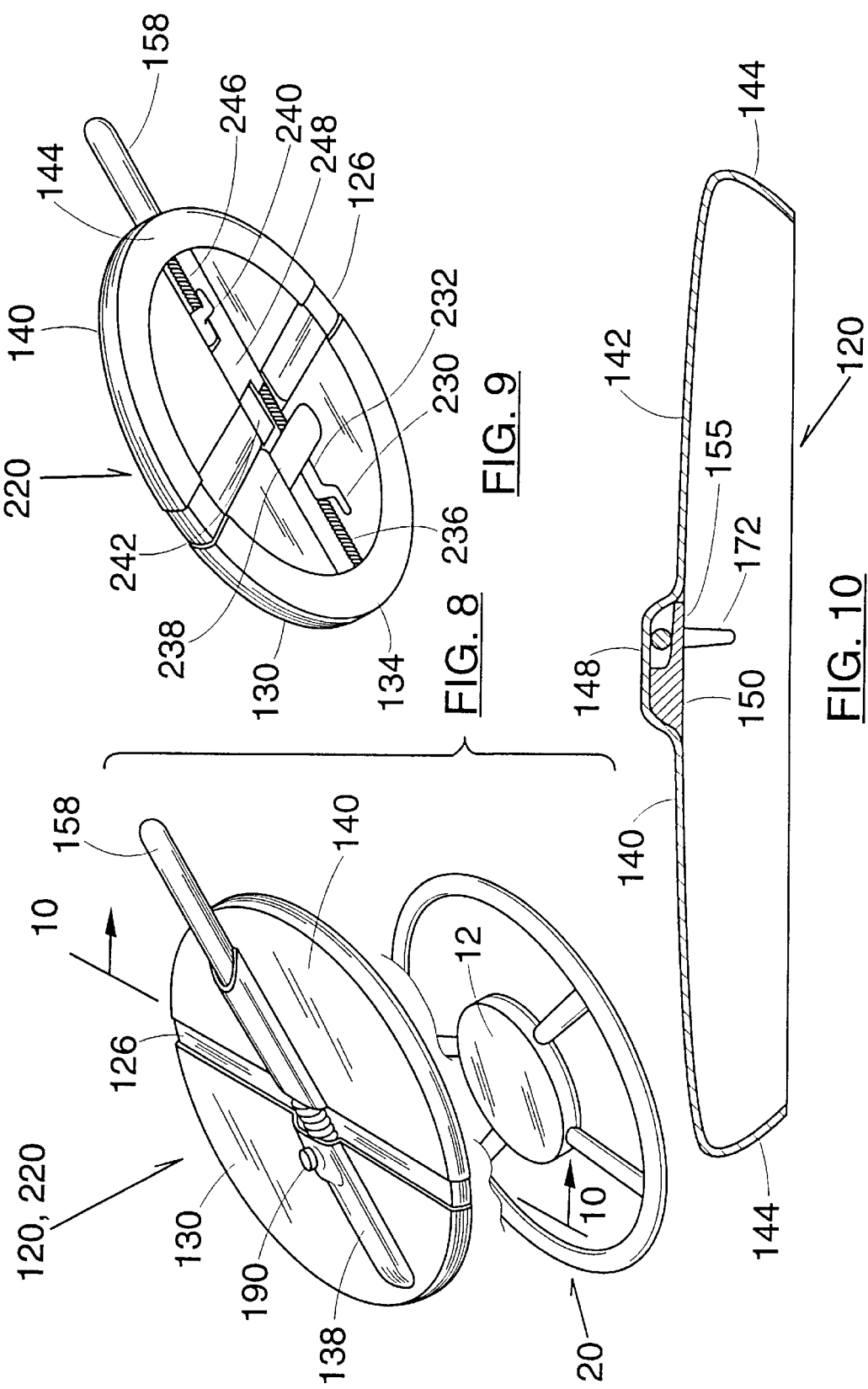

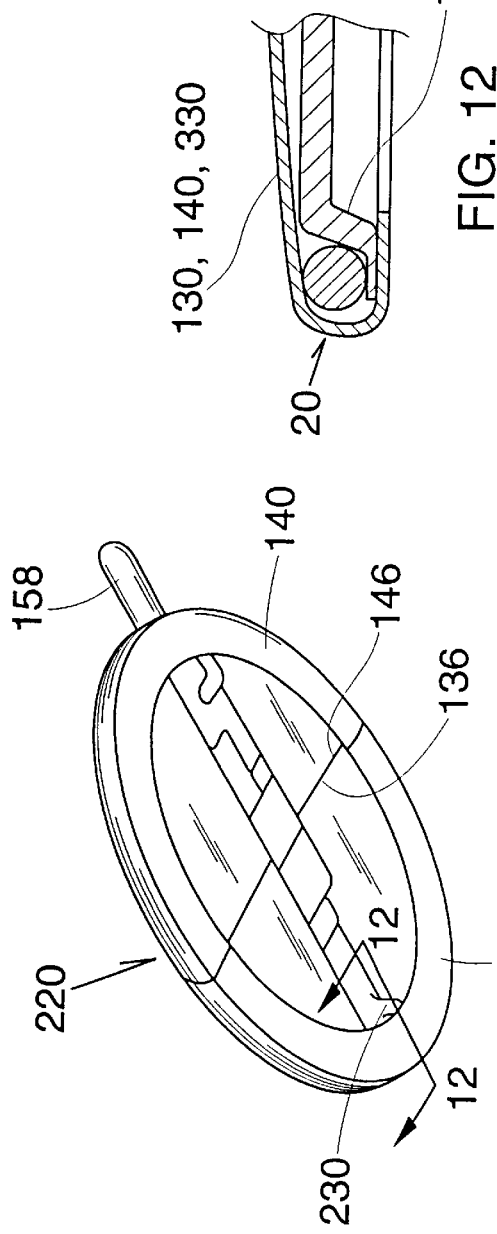

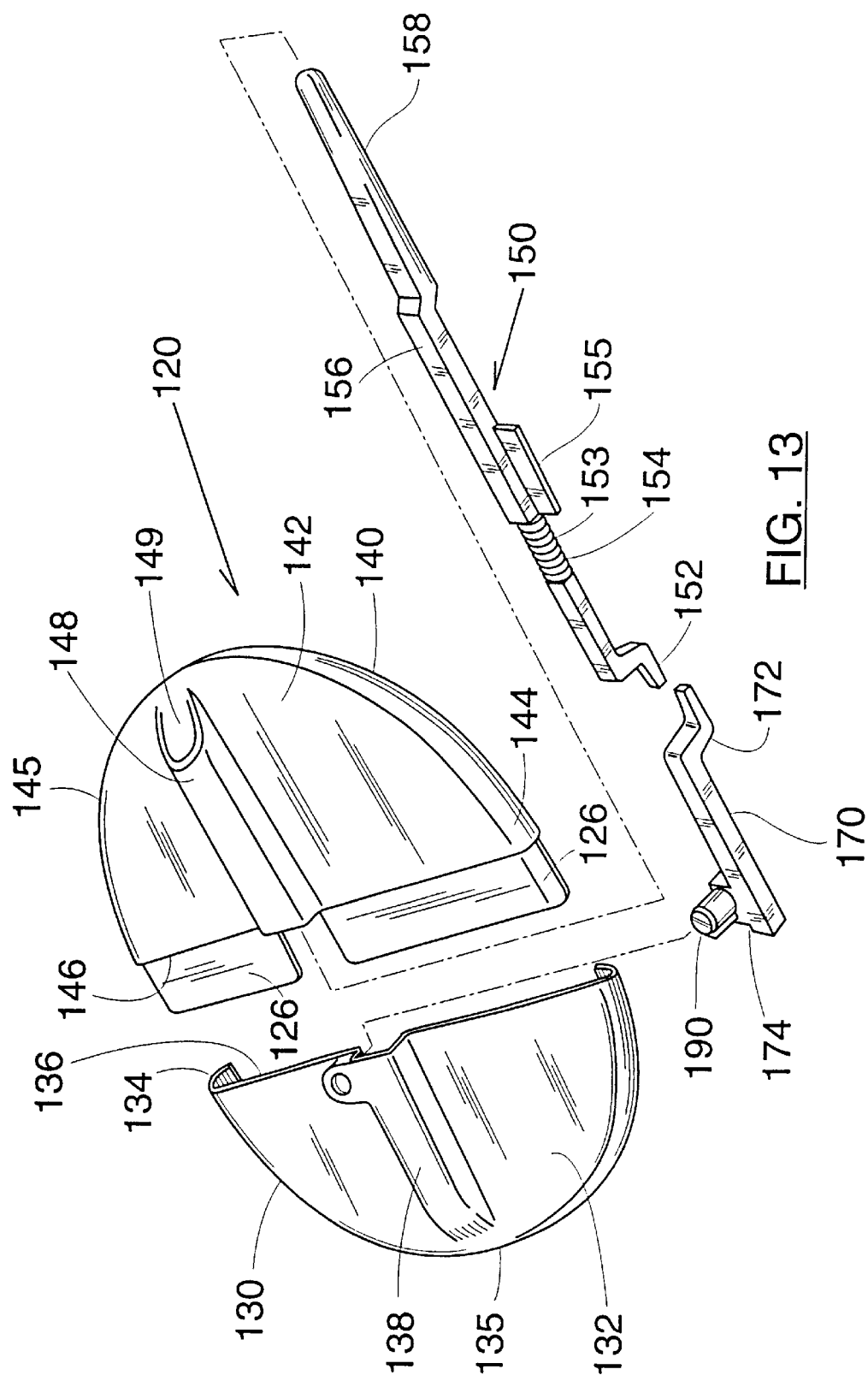

VEHICLE ANTI-THEFT STEERING WHEEL LOCKING MECHANISM

This application is a Division of application Ser. No. 08/610,157 filed on Feb. 29, 1996 which is a Continuation-in-Part of application Ser. No. 08/419,336 which was filed on Apr. 10, 1995, now abandoned.

BACKGROUND OF THE INVENTION

There are many devices commercially available to protect a vehicle or automobile from theft. Such related devices include electrical alarms, fuel shut-off devices, ignition kill switches, and steering wheel locking mechanisms. The present invention falls within the final category of theft prevention devices.

One effective way of preventing the theft of a vehicle is to lock or substantially restrict movement of the vehicle's steering wheel. By doing so, the vehicle is rendered nearly inoperable. Because a would-be thief cannot steer or control a vehicle having an inoperable steering mechanism, the vehicle to which the present invention is attached is less likely to be stolen.

Many steering wheel locking devices are available today. However, most have substantial weaknesses that render the devices ineffective. For example, many steering wheel locking devices are easily removed from the steering wheel by simply cutting the steering wheel rim in one location. Other devices do not even require the single cut. They can be removed or disabled by flexing or deforming the steering wheel rim or the other structure to which they are attached (i.e. brake pedal). Furthermore, most commercially available competing devices provide no protection for the safety restrain system airbag located within the steering wheel.

While many such steering wheel locking devices are available on the market today, none have the same structure and benefits as my invention. It is an object of my invention to provide a vehicle steering wheel locking mechanism that encapsulates the entire vehicle steering wheel. It is a further object to provide a vehicle steering wheel locking mechanism that includes a radial arm member to limit the allowable rotationable position of the steering wheel when the vehicle steering wheel locking mechanism is installed. It is yet a further object to provide such a mechanism that uses either a standard, commercially available padlock or a built-in lock mechanism. It is yet a further object to provide a vehicle steering wheel locking mechanism that is easy to install on any vehicle steering wheel and easy to remove. Additionally, it is an object of my invention to provide a steering wheel locking mechanism which by encapsulating the steering wheel will prevent access to the steering wheel or its contents and controls, such as the safety restraint system airbag or the horn or the cruise control. Finally, it is an object of the present invention to provide a device which presents a readily ascertainable visual impact to act as a deterrent to a would-be thief.

Steering wheels vary in diameter and rim thickness by vehicle manufacturer. My invention can be placed and securely locked on all passenger vehicle, light truck, and many commercial vehicle steering wheel rims thus eliminating the need of the user to select a locking device that fits his or her specific vehicle.

Furthermore, this feature of my design allows the same locking device to be used on more than one vehicle (i.e. transferred from vehicle to vehicle).

In addition to protecting the entire vehicle from theft, my invention also protects the vehicle's driver side safety restraint system air bag from theft. Recently, the theft of steering wheel mounted safety restraint system air bags from vehicles has been increasing at an alarming rate. By simply unscrewing a few bolts and cutting a few wires, the air bag assembly located within the center portion of many vehicle steering wheels can be removed. It takes approximately one minute to remove an unprotected air bag. In addition to encapsulating the steering wheel, the structure of my invention forms a solid web that covers the entire front surface of the steering wheel thus preventing the removal of the air bag assembly on vehicles so equipped.

The key factor to be considered when evaluating steering wheel locking mechanisms is the amount of time it takes for a thief to remove the device. Some devices can be removed in less than a minute by simply cutting through the steering wheel rim in only one place. Others can be removed by placing a pry bar or similar tool between the steer wheel and locking mechanism thus allowing the thief to "peel" the locking mechanism off of the steering wheel.

The longer it takes to remove or attempt to remove a device, the more effective the device is in preventing vehicle theft. The present invention requires a minimum of four cuts through both the steering wheel rim and encapsulating portions of the locking mechanism before it can be removed by peeling. The total time required to remove the best competing device on the market at present exceeds five minutes. The competing device does not include the novel features of my vehicle steering wheel locking device. My novel features are discussed in detail herein. Criminologists believe that if a locking device requires more than five minutes for removal, a thief is likely to avoid attempting the removal, and thus vehicle theft, altogether.

My vehicle steering wheel locking mechanism provides a safe and effective theft deterrent. Because its structure encapsulates the entire steering wheel and forms a solid web across the steering wheel, it is very difficult for a thief to cut through the entire encapsulating structure or through a portion of the steering wheel in order to remove my locking mechanism. In addition my invention also protects a vehicle air bag from theft. These and other features of my invention will become evident in the following descriptions.

SUMMARY OF THE INVENTION

My invention comprises a device for locking a vehicle steering wheel and substantially preventing the steering wheel's rotation beyond a small amount such that the vehicle having the steering wheel to which the locking mechanism is attached is rendered substantially inoperable. Furthermore, my invention prevents the removal or theft of the air bag assembly located within the central portion of the steering on vehicles so equipped.

The device comprises first and second semi-circular casings, a radial bar member, a receiving tube, and a lock. Each casing has an inwardly curved lip disposed around the circular or arcuate portion of its periphery. The first and second casings are designed to fit together and over the vehicle's steering wheel to completely encase the rim of the steering wheel. The two casings are secured together by the radial lock bar, receiving tube, and lock. When secured around the outer rim of the steering wheel in this manner, the casings prevent any portion of the rim from being easily cut or broken by a thief in addition to substantially preventing the steering wheel's rotation.

A radial bar is permanently attached to the outer surface of the first casing. A tubular receiving member having an outer diameter less than the inner diameter of the radial bar is permanently attached to the outer surface of the second casing. The tubular receiving member fits into and is passed through the radial to secure the two casings together and to secure the casings to the rim of the vehicle steering wheel.

The radial bar includes a first opening or aperture and the tubular member includes a second opening or aperture. When the casings are secured together their inwardly curving lips are completely disposed around the periphery of the vehicle's steering wheel and the apertures come into alignment. The shackle of a padlock or the pin of an encased lock assembly passes or extends through the aligned openings to lock the two casings together and around the steering wheel rim.

A second alternative embodiment of my invention comprises similar first and second semi-circular casings but employs a different locking mechanism and additional hooking mechanisms. A first bar member including a radial end portion, attachment portion, guide portion, notched portion and hook structure is attached to the underside of the second semi-circular casing such that the radial bar portion extends a predetermined distance beyond the inwardly curving lip of the casing and such that the notched portion and the hook structure extend a predetermined distance beyond the edge of the second casing. A second bar member, including a locking mechanism, attachment mechanism, and similar hook structure is attached to the first casing such that the similar hook structure extends beyond the end of the first casing. When the semi-circular casings are brought together, the opposing hook structures approach the inwardly curving portions on the opposite casing. When the casings are still separated a predetermined distance, the diameter of the embodiment is greater than the diameter of the vehicle steering wheel. In this position, the embodiment can be placed over and onto the steering wheel rim. Next, the casing halves are brought together into a closed position. As the casing halves approach one another, the hook structures are moved toward the opposite inwardly curving lips thus fully encapsulating a portion of the vehicle steering wheel. In other words, a portion of the circumference of the steering wheel rim is fully encased by the inwardly curving lip structure and hook structure.

When the casings are in the closed position, the lock mechanism attached to the second bar member is positioned above the notched portion of the first bar member. A pin or similar devices is deployed from the lock mechanism. The pin engages one or more of the notches along the notched portion of the first bar and thus locks the casing halves around the steering wheel rim.

The radial bar portion extends a predetermined distance beyond the outer edge of the second casing. The radial bar member prevents substantial rotation of the steering wheel as the bar member is of a sufficient length to contact the vehicle headliner, windshield, or floor thus limiting the amount of rotation of the steering wheel.

A third alternative embodiment of my invention is similar to the second embodiment except that it employs a different mechanism for engaging and disengaging the hook structures. In the third embodiment, each hook structure is slidably engaged within a respective semi-circular casing. A spring is located between the inwardly curving lip and end of the hook structure thus biasing the hook structure away from the inwardly curving lip. A tongue structure is attached to the opposite side of each inwardly curving lip. The tongue structure extends beyond the end of each casing half.

This embodiment is placed onto and over the steering wheel rim. Next, the casing halves are brought together into the closed position. As the casing halves approach one another the respective tongues from each hook contact the leading edges of the opposed halves. As the halves continue to approach one another, the tongues make contact with the leading edges and in turn bias the hooks toward the inwardly curving lips of the semi-circular casings. In the fully closed position, portions of the steering wheel circumference are fully encapsulated by the inwardly curving lip in combination with the hook structure. The embodiment is locked onto the steering wheel in a manner similar to the second embodiment.

When the user wishes to remove this embodiment, he or she simply unlocks the device and separates the casing halves. As the casing halves are separated, the springs bias the hooks away from the inwardly curving lips of the casings thus allowing the removal of the entire device.

In a fourth alternative embodiment of my invention, two hook mechanisms are also employed. The first hook mechanism is similar to the hook mechanisms of the third embodiment. The tongue structure is employed to bias the hook toward the inwardly curving lip of the casing as the device is closed and locked onto the steering wheel rim. When the device is removed, a spring biases the hook away from the inwardly curving lip thus preventing the removal of the locking device.

In addition to the above noted hook structure, a second hook structure and different locking mechanism is employed in this embodiment. The second hook mechanism includes a "J" shaped hook having a stem, a first end, and a second end. The stem fits in a lock casing and further includes a notched portion. The lock casing is positioned directly beneath the radial bar member which further includes a plurality of notches formed along its length. After the device has been placed over and onto the steering wheel, the casing halves are brought together. As indicated above as the casing halves approach one another the first hook mechanism approaches the inwardly curving lip thus fully encapsulating a portion of the steering wheel aim. Next, the user biases the "J" hook upward and into the lock casing and toward the semi-circular casing. As the "J" hook is biased upward, its two ends each enter a notch formed along the radial bar member. A nub attached to the lock assembly engages the notch cut into the stem of the "J" hook thus securing the hook in its locked position. Because the opposite end of the radial bar member is fixedly attached to the opposite casing, the casing halves cannot be separated once the ends of the "J" hook have engaged with the notches along the radial bar member.

To remove the device, the user simply unlocks the lock assembly thus allowing the "J" hook to retract from the locked position. Once the ends of the "J" hook have disengaged from the notches along the radial bar member, the casing halves can be separated. As the casing halves are separated, the spring within the first hook mechanism biases the hook away from the inwardly curving lip thus allowing the entire device to be removed from the vehicle steering wheel.

In each of my embodiments, it is important to note that my vehicle steering wheel locking mechanism will fit securely on steering wheel rims of varying diameters. Thus, the same locking mechanism can be used on a vehicle having a 15 inch diameter steering wheel and on a vehicle having a 16 inch diameter steering wheel.

Finally, my invention could be described as a method for preventing the theft of a vehicle, the method comprising the steps of placing first and second semi-circular casings, wherein each casing has an inwardly curved lip disposed about its periphery, over a vehicle steering wheel and securing the first casing to the second casing to prevent movement of the steering wheel.

DESCRIPTION OF THE DRAWINGS

FIG. 4 is a bottom plan view of my vehicle steering wheel mechanism assembled.

FIG. 5 is bottom plan view of an alternative embodiment of my vehicle steering wheel locking mechanism.

FIG. 6 is a front cut away view of my vehicle steering wheel locking mechanism attached to the steering wheel of a vehicle.

FIG. 7 is a end view of the alternative lock assembly of my invention.

FIG. 8 is a top perspective view of a second embodiment of my invention and includes a vehicle steering wheel with an air bag assembly.

FIG. 9 is a bottom perspective view of the second embodiment of my invention.

FIG. 10 is a cut away view of the second embodiment of my invention taken along line 10—10 of FIG. 8.

FIG. 11 is a bottom perspective view of a third embodiment of my invention.

FIG. 12 is a partial cut away view of the third embodiment of my invention taken along line 12—12 of FIG. 11.

FIG. 13 is an exploded top perspective view of the second embodiment of my invention.

FIG. 16 is a cut away view of the third embodiment of my invention taken along lines 16—16 of FIG. 15.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

My invention, shown generally at 10 in FIGS. 1–6, comprises a first and a second semi-circular casing 30 and 40, a radial bar 70, a tubular receiving member 80, and a locking mechanism 90.

Figure 1:
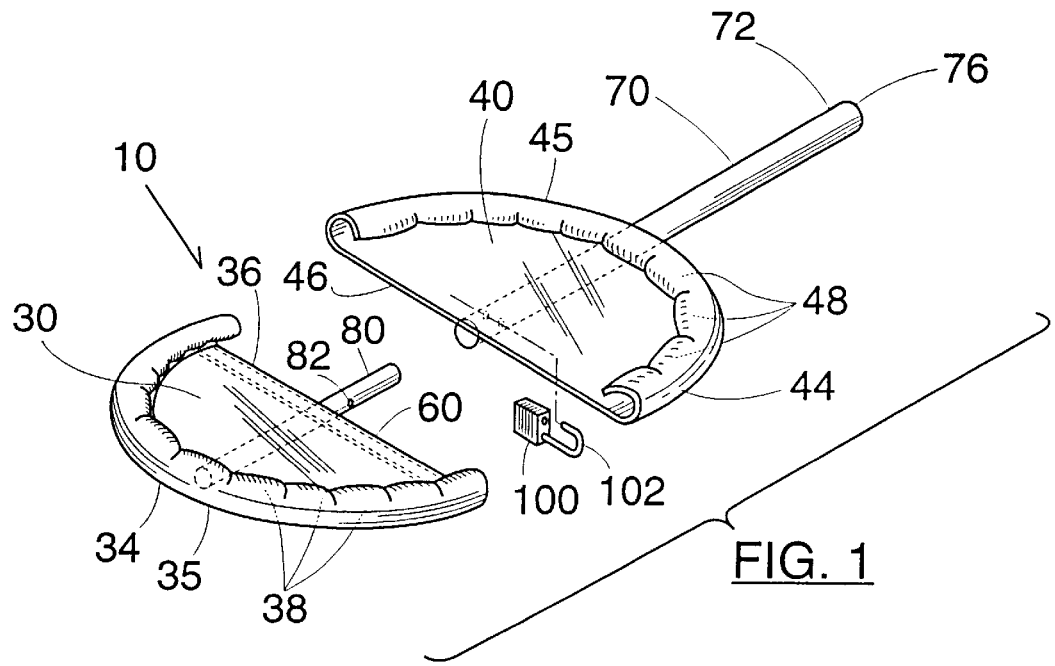
FIG. 1 is an exploded perspective view of my invention.
Figure 2:
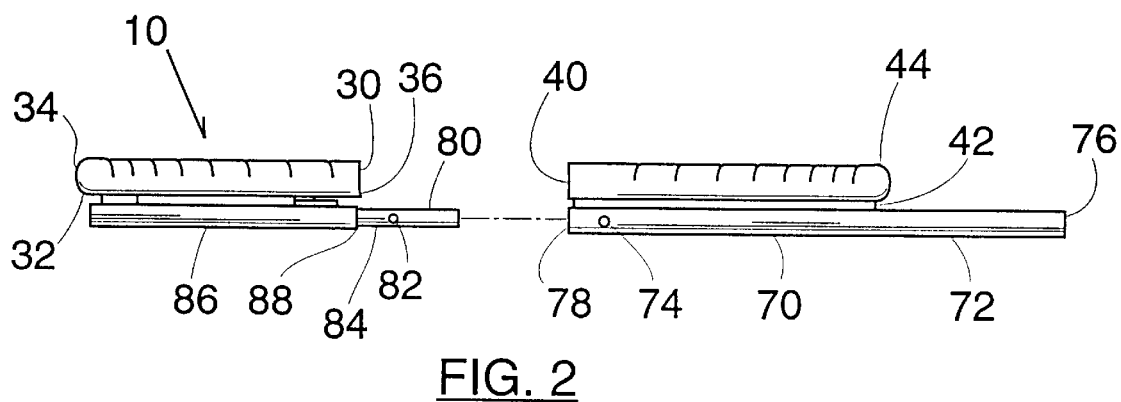
FIG. 2 is a front elevational view of my vehicle steering wheel locking mechanism disassembled.

The first and second semi-circular casings 30 and 40 each have top surfaces 32 and 42, inwardly curving lips 34 and 44, circular or arcuate peripheries 35 and 45, and overlapping edges 36 and 46. The radial bar 70 is attached to casing 40 and the tubular member 80 is attached to casing 30. While welding is the preferred attachment means for attaching radial bar 70 and tubular member 80 to casings 40 and 30 respectively, any other suitable attachment mechanism could be utilized. When casings 30 and 40 are brought together for installation on a steering wheel 20, tubular receiving member 80 is slidably received into radial bar 70 as shown in FIGS. 1 and 2. The casings 30 and 40 are brought together until their inwardly curving lips 34 and 44 encompass the outer diameter of the steering wheel 20 as shown in FIG. 6. In this position, edges 36 and 46 are in an overlapping relationship.

In the preferred embodiment of my invention 10, tubular receiving member 80 comprises two tubular members 84 and 86, as shown in FIG. 2. Member 84 has an outer diameter sized to fit within radial bar 70 while member 86 has an inner diameter equal to the inner diameter of radial bar 70. Member 86 is permanently attached by welding to casing 30. Tubular member 84 is positioned such that a portion of the member 84 is located and attached within member 86. The remaining portion extends out of tubular member 86 and is received by radial arm 70. The advantage of this embodiment is that a stop 88 is created. End 78 of radial bar 70 rests against stop 88 when the member 84 has been fully inserted into radial bar 70.

When inwardly curving lips 34 and 44 encompass steering wheel 20 and edges 36 and 46 overlap, aperture 74 in radial bar 70, comes into alignment with aperture 82 in tubular member 80. A padlock 100 having a shackle 102 is used to lock casing 30 to casing 40 such that they cannot be removed from the steering wheel 20. The shackle 102 is passed through aligned apertures 74 and 82 and the lock 100 is locked.

Alternatively, a lock assembly 90 can be employed to lock casings 30 and 40 together. Locking mechanism 90 includes a casing 92, a tumbler 94 having a key hole 96 and a locking pin 98. Locking mechanism 90 is well known in the art. When the mating key is inserted into key hole 96 and rotated, tumbler 94 also rotates and extends or retracts locking pin 98. Thus to lock the device 10 to vehicle steering wheel 20, the key is inserted and rotated in a first direction which extends locking pin 98 into aligned apertures 74 and 82. To unlock the invention 10 the key is rotated in the opposite direction whereby locking pin 98 is retracted from the aligned apertures 74 and 82.

Figure 3:
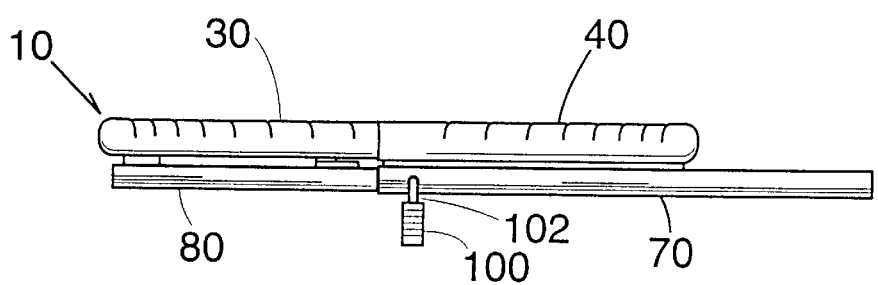
FIG. 3 is a front elevational view of my vehicle steering wheel locking mechanism assembled and includes a padlock.

As best shown in FIGS. 1–3, radial bar 70 has a long end 72 which extends beyond the top surface 42 of casing 40. In my preferred embodiment, the length of the extension is 10.5 inches (26.7 cm) beyond top surface 42. End 72 effectively prevents steering wheel 20 from being rotated more than a few degrees when my invention is installed on a vehicle. My device 10 is installed so that long end 72 is positioned either to the light or left of steering wheel 20. In this position, the end 76 of long end 72 makes contact with the windshield of the vehicle at one extreme and the seat, door, or door frame of the vehicle at the other extreme. Thus, the rotation of the vehicle steering wheel 20 is significantly limited and the vehicle is rendered substantially inoperable.

As shown in FIGS. 1 through 4, casings 30 and 40 can be formed from a sheet of steel which is cut radially and then formed to produce inwardly curving lips 34 and 44. Overlapping sections 38 and 48 are then spot welded or attached by any suitable means, to form casings 30 and 40. As shown in FIG. 5, casings 30 and 40 could be molded from either metal or plastic. Utilizing this process would eliminate the overlapping sections 38 and 48 shown in FIGS. 1 through 4. This alternative process changes only the appearance and does not change the function, purpose, or general structure of my invention.

As shown in FIG. 1, a reinforced bar 60 is attached to overlapping edge 36 of casing 30. The purpose of the reinforced bar 60 is two-fold. First, bar 60 strengthens overlapping edge 36 and prevents it from warpage or deformation after repeated uses of my invention 10. Second, reinforcement bar 60 prevents a would-be thief from easily inserting a pry bar or the like between mating casings 30 and 40 in an attempt to pry the casings 30 and 40 off of the vehicle steering wheel 20.

The second embodiment of my invention is shown generally at 120 in FIGS. 8, 10, 12 and 13. The second embodiment 120 includes first and second semi-circular casings 130 and 140, a first bar member 150, a second bar 170, and a locking mechanism 190.

Referring to FIG. 13, the first and second semi-circular casing 130 and 140 each have top surfaces 132 and 142, inwardly curving lips 134 and 144, circular or arcuate peripheries 135 and 145, and substantially straight edges 136 and 146. In addition, a pair of plates 126 each having an inwardly curving lip slightly less in diameter from lips 134 and 144 are attached along edge 146 of casing 140. The plates 126 could alternatively be attached to casing 130.

In this second embodiment 130, the second bar member 170 is attached to the first semi-circular casing 130 and the first bar member 150 is attached to the second semi-circular casing 140. In the preferred embodiment, and as shown in FIGS. 8 and 13, the first and second rod members 150 and 170 are housed within and attached to raised portions 138 and 148 formed along the top surfaces 132 and 142 of casings 130 and 140. However, it is to be understood that bar members 150 and 170 could be attached directly to casing 130 and 140 and that the raised portions 138 and 148 are not required.

Hooks 152 and 172 are attached to the ends of each respective bar member 150 and 170. In addition to its hook 152, bar member 150 includes a notched portion 154, guide portion 155, and attachment portion 156, and a radial bar portion 158. The attachment portion 156 is fixedly attached, preferably by welding although any suitable attachment means could be employed, to the underside of the second casing 140 within raised portion 148. The radial bar portion 158 extends a predetermined length beyond the inwardly curing lip 144 on the outer edge of the second casing 140 through opening 149 in raised portion 148. The hook 152 and notched portion 154 protrude past the straight edge 146 of the casing 140.

The second bar member 170 includes the hook 172, an attachment portion 174, and a lock mechanism 190. The hook 172 protrudes past the straight edge 136 of the second casing 130. The attachment portion 174 is attached, similar to the first bar member to the underside of the first casing 130 within raised portion 138. The lock mechanism 190 is attached near the end of the second bar 170 opposite the hook 172 and is furthermore offset from the bar member 170 as shown in FIG. 13.

The steering wheel locking mechanism 120 is assembled as follows: First attachment portion 174 is attached to casing 130. Next casing 140 is brought into alignment with casing 130 such that the casings 130 and 140 are separated by only a small distance. Bar member 150 is next positioned within casing 140. In this position, bar member 170 is located between guide 155 and the bottom surface of raised portion 148 as shown in FIG. 10. Finally, bar member 150 is attached along attachment portion 156 to casing 140. Positioning of member 170 between guide 155 and raised portion 148 allows casing 130 and 140 to be separated a predetermined distance. However, the casings 130 and 140 cannot be completely separated from one another.

The bar members 150 and 170 are positioned within raised portions 138 and 148 of semi-circular casings 130 and 140 such that when the casings 130 and 140 are brought together and closed, each respective hook 152 and 172 engages with a portion of the steering wheel 20. When each hook 152 and 172 is in this position, the circumference of the portion of the steering wheel rim 20 is fully surrounded by the inwardly curving lip 134 or 144 of the semi-circular casing 130 or 140 and hook 152 or 172, as shown in FIG. 12.

When the semi-circular casings 130 and 140 are pulled apart from one another a predetermined distance, each hook 152 or 172 simultaneously moves away from the inwardly curving lip 134 or 144. During the separation of the casings 130 and 140, the diameter of the locking mechanism 120 increases to allow the removal of the locking mechanism 120 from the steering wheel 20. When the two casings 130 and 140 are brought back together, the hooks 152 and 172 attached to their respective bar members 150 and 170 nest into the adjacent casing. As the casings 130 and 140 are brought together, the hooks 152 and 172 approach the inwardly curving lips 134 and 144 of the respective casings 130 and 140 within which they are positioned. In the fully closed position, the end of each respective hook 152 and 172 comes into substantial contact with the respective casing inwardly curving lip 134 and 144.

The lock mechanism 190 is a known lock assembly similar to the lock assembly 90 shown in FIG. 7, and includes a key hole, a tumbler, and a pin 192. The pin 192 (not shown, please see similar locking pin 98 in FIG. 7) is extended and retracted when the lock 190 is operated. When the steering wheel locking mechanism 120 is in its fully closed position, the lock mechanism 190 is located over the notched portion 154 of the first bar member 150. When the lock 190 is operated by the user, the pin 192 drops into one of the notches 153 along the notched portion 154 and thus the steering wheel locking mechanism 120 is securely locked to the vehicle steering wheel 120. In this locked position, casings 130 and 140 cannot be separated.

A third embodiment of my invention is shown generally as 220 in FIGS. 8, 9, 11, and 12. The top view of the third embodiment 220 shown in FIG. 8 is identical to the second embodiment 120. The third embodiment 220 includes first and second semi-circular casings 130 and 140, radial bar member 158, and the locking mechanism 190. The differences between the second and third embodiments reside in the actuating mechanism for the first and second hooks 230 and 240.

Embodiment 220 is shown in its open position in FIG. 9 and in its closed position in FIG. 11. Referring to FIG. 9, each hook 230 and 240 includes a respective tongue 232 and 242. Each tongue 232 and 242 extends from its respective hook 230 and 240 toward the edge 136 and 146 of each casing 130 and 140. A spring 236 and 246 is nested between the front portion of each hook 230 and 240 and outermost part of the raised portion 138 and 148. Guide plates 238 and 248 are provided to keep the hooks 230 and 240 and tongue 232 and 242 in their proper positions within raised portions 138 and 148.

When the casing halves 130 and 140 are separated, as shown in FIG. 9, the springs 236 and 246 bias hooks 230 and 240 respectively away from inwardly curving lips 134 and 144. In this position, the device 220 can be removed from or placed over a vehicle steering wheel 20. After the device 220 has been placed over the steering wheel 20, the two casings 130 and 140 are brought together by the user. As the casings 130 and 140 come together, their tongues 232 and 242 each make contact with the opposite casing edge 146 and 136. As the casings 130 and 140 continue to come together around the steering wheel rim 20, the hooks 230 and 240 are pushed into the position shown in FIG. 12. The fully closed device 220 is shown in FIG. 11.

The fourth embodiment of my invention is shown generally at 320 in FIGS. 14–17. The fourth embodiment 320 also includes first and second semi-circular casings 330 and 340, a bar member 350 and a first hook mechanism 370, a second hook mechanism 380, and a locking mechanism 390.

Again, the first and second semi-circular casings 330 and 340 each have top surfaces 332 and 342, inwardly curving lips 334 and 344, circular or arcuate peripheries 335 and 345, and substantially straight edges 336 and 346.

As opposed to the previous embodiments, the two semi-circular casings 330 and 340 each include different hook structures. In this embodiment, the first hook mechanism 370 is similar in structure to the hooks utilized on the second and third embodiments. However, the second hook mechanism 380 and locking mechanism 390 differ.

Figure 17:
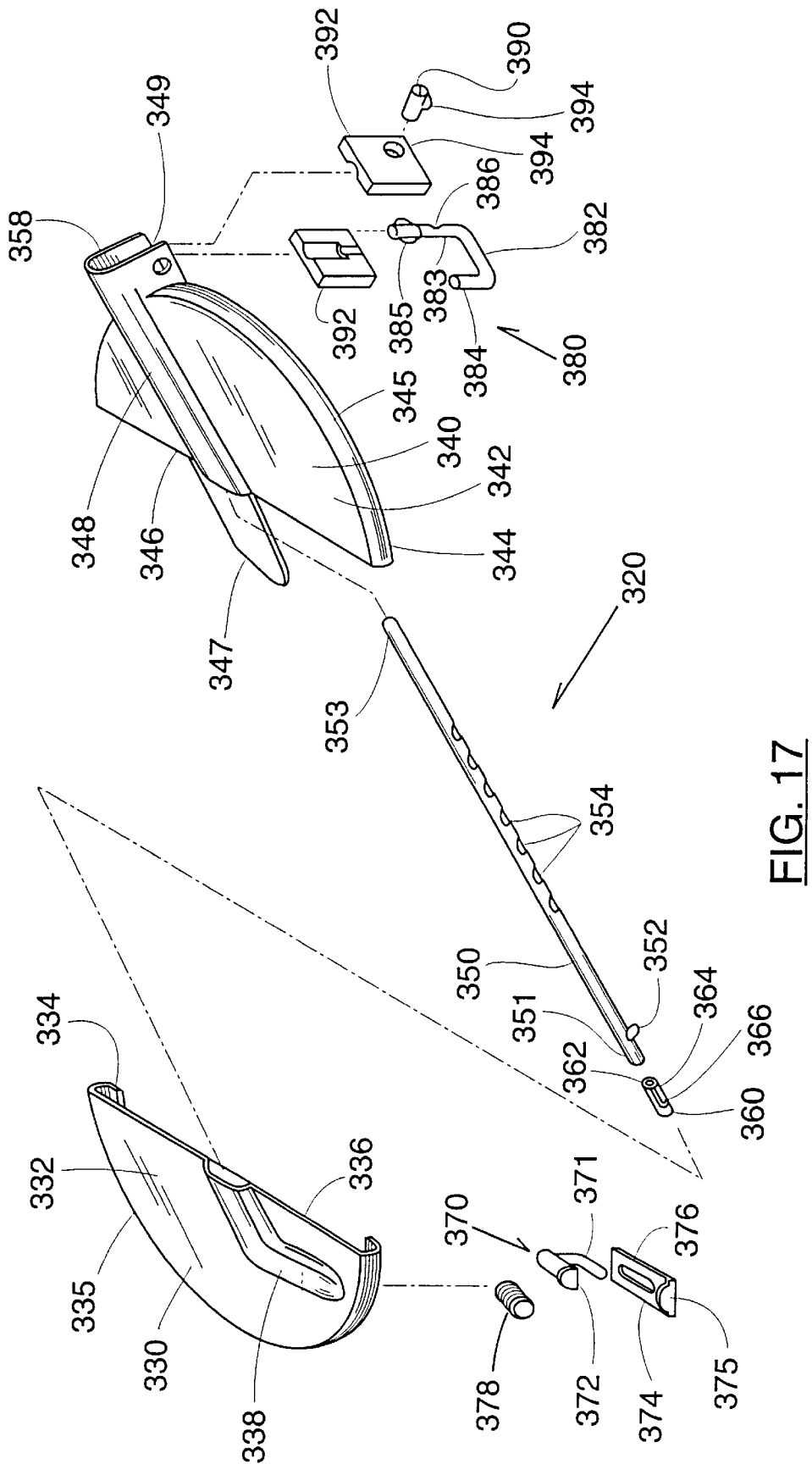
FIG. 17 is an exploded view of the third embodiment.

As best shown in FIG. 17, a raised portion 338 is formed on a top surface 332 of the first semi-circular housing 330. The raised portion 338 is not straight but offset as shown in the figure. The first mechanism 370 resides within the raised portion 338. The mechanism 370 includes a hook structure 371, a plate 374, and a spring 378. The hook 371 has a tab 372 attached at the top surface. The plate 374 includes a tab 375 and an elongated opening 376. The hook 371 passes through the elongated opening 376 in the plate 374. The spring 378 is located between the plate tab 375 and the hook tab 372. The plate 374 is permanently attached to the underside of casing 330.

Also, permanently attached to casing 330 is a receiving member 360 for receiving the end 351 of a radial bar 350. The receiving member 360 comprises a hollow inner cavity 362 and longitudinal slot 364 including a locking offset portion 366. A nub 352 is attached near the end 351 of the radial bar 350 as shown in FIG. 17. The end 351 of the radial bar 350 is placed within the receiving member 360 such that the nub 352 aligns with the slot 364. As the end 351 of the radial bar 350 is inserted into the receiving member 360, the nub 352 slides along the slot 364. After full insertion, the radial bar member 350 is twisted and the nub 352 slides into the offset portion 366 thus locking the bar 350 into the receiving member 360.

Semi-circular casing 340 includes a tongue structure 347, a raised portion 348 for receiving the radial bar member 350, and an opening 349 for receiving the lock assembly 390. As the casing halves 330 and 340 are brought together the tongue structure 347 contacts the tab 372 and the hook 371 and biases the hook 371 toward the inwardly curving lip 334 of the casing 330 and around the steering wheel rim 20. In the preferred embodiment, the tongue structure 347 is an integral part of casing 340. However, it is to be understood that the tongue structure could be a separate structure from the casing or coupled to the casing or the function of the tongue structure could be performed by another component.

Figure 15:
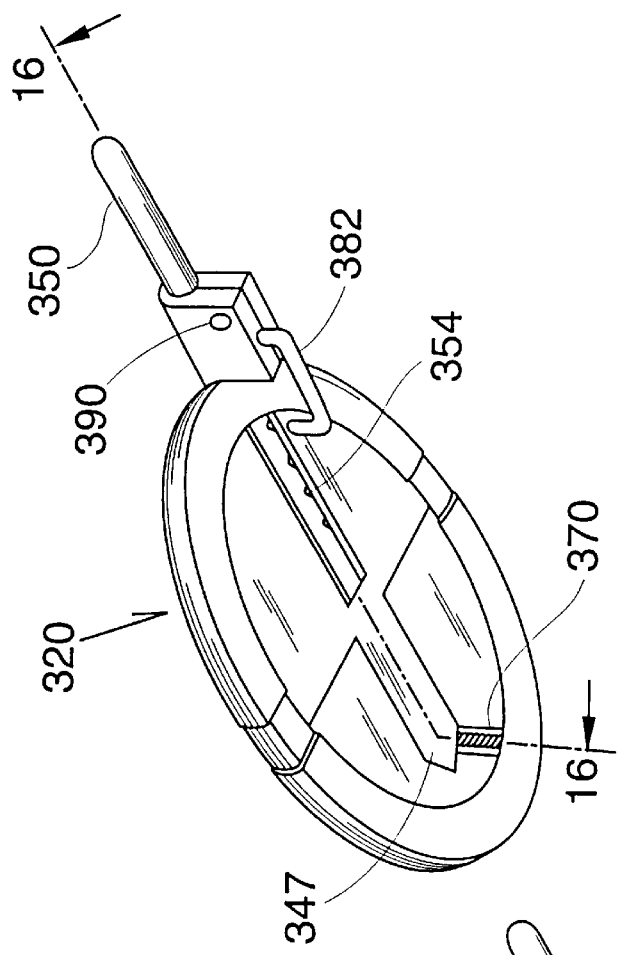
FIG. 15 is a bottom perspective view of the third embodiment of my invention.
Figure 14:
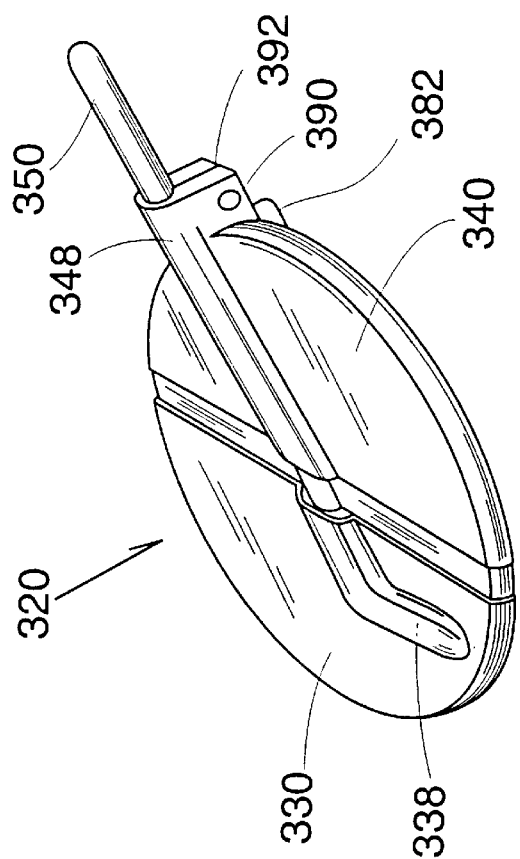
FIG. 14 is a top perspective view of the third embodiment of my invention.

Within raised portion 348 of casing 340, a hollow tubular housing 358 is provided for receiving the radial bar member 350. The hollow tubular housing 358 is formed by the gap between the inner face of the raised portion 348 and the lock casing 392 received by the raised portion 348 as shown in FIG. 15. At the outer edge 345 of casing 340, the locking mechanism 390 and second hook 380 are located. The second hook mechanism 380 includes a "J" hook 382 and a hook and lock casing 392. The hook and lock casing 392 is shown as two halves in FIG. 17. The halves are shown for clarity and it is to be understood that the entire casing 392 could be constructed from a single piece of material.

The "J" hook 382 has a stem 383 and two ends 384 and 385. A notch 386 is formed within the stem 383. The lock casing 392 has a channel running through it which houses the stem 383. The lock casing 392 further includes an opening 394 for receiving the lock assembly 390. A nub 394 is formed on the side of the lock assembly as shown in FIG. 17.

The user initially locks the radial bar member 350 into casing 330 by inserting the end 351 of the bar 350 into the receiving member 360 and twisting it into the locked position. Next, the radial bar member 350 is passed through the tubular housing 358 in casing 340. The radial bar member 350 extends a predetermined distance past the outer edge 345 of the casing. After the two casing halves 330 and 340, now connected by the radial bar member, have been placed over the steering wheel 20 and are brought together into the closed position, the tongue structure 347 contacts and biases the first hook assembly 370 around the steering wheel rim 20 such that a portion of the rim 20 is fully encased by the hook 371 and inwardly curving lip 334. The relationship of the hook 371, inwardly curving lip 334 and steering wheel 20 is the same as shown in FIG. 12. Next, the "J" hook 382 is biased by the user toward casing 340. As "J" hook 382 is brought toward casing 340, end 385 enters notch 354 on the radial bar member 350. When "J" hook 382 is firmly seated within the lock casing 392, the lock tubular mechanism 390 is turned so that the nub 394 on the tumbler engages the notch 386 on the stem portion 383 of the "J" hook 382. Thus, a second portion of the steering wheel rim 20 is also fully encapsulated by inwardly curving lip 344 and "J" hook 382. The relationship of the inwardly curving lip 344, "J" hook 382 and steering wheel 20 in the closed position is best shown in FIG. 16.

To remove the steering wheel locking device 320, the user simply re-inserts the key into lock 390. When the tumbler is turned, "J" hook 382 retracts from the lock casing 392. In its retracted position, the hooks' ends 384 and 385 are no longer engaged with the notches 354 in the radial bar member 350. Thus, the two semi-circular casings 330 and 340 can be separated and the entire device 320 can be removed from the steering wheel 20 for storage. If the user desires, the device 320 can be further disassembled for stowage by removing casing 340 from the radial bar 350 and by further removing the radial bar 350 from casing 330. In its stowage condition, the device will be no wider than one-half of the steering wheel rim diameter and thus will fit conveniently under the vehicle seat or in the vehicle trunk. Alternatively, the user may chose to leave the device fully assembled in the open position so that it can quickly be reinstalled on the steering wheel 20.

In each of my four embodiments 10, 120, 220, and 320, the steering wheel locking mechanism not only encases the steering wheel rim 20, but also covers or forms a solid web over the safety restraint system air bag 12. Thus, my invention provides a theft deterrent and theft protection for the vehicle itself as well as its safety restraint system air bag.

Alternatively, my invention can be described as a method for preventing the theft of a vehicle, the method comprising the steps of placing first and second semi-circular casings 30 and 40, having inwardly curving lips 34 and 44 disposed about their semi-circular peripheries 35 and 45 over the outer rim 20 of a vehicle steering wheel by sliding a tubular receiving member 80 into a radial bar member 70, bring the respective casings 30 and 40 to which the members 70 and 80 are attached together until their edges 36 and 46 are in an overlapping relationship, and securing the first casing 30 to the second casing 40 to prevent substantial movement of the steering wheel 20.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An anti-theft device for a vehicle steering wheel having an outer circular rim, said device comprising:

a first casing having a periphery and an inwardly curving lip disposed around the periphery;

a second casing having a periphery and an inwardly curving lip disposed around the periphery;

a first hook mechanism slidably engaged within the first casing;

an actuating mechanism for engaging the First hook mechanism, the actuating mechanism attached to the second casing;

a second hook mechanism attached to the second casing;

the second hook mechanism having at least one end;

a radial bar member having a first end, a mid section, and a second end;

the first radial bar member end removably attached to the first casing;

the radial bar member mid section having a plurality of notches formed therein;

the second radial bar member end extending a predetermined distance beyond the second casing periphery;

the second hook mechanism end engagable into at least one of the radial bar member notches.

2. The device of claim 1 further including a locking mechanism;

the locking mechanism attached to the second casing and engagable with the second hook mechanism.

3. The device of claim 1 wherein the second hook mechanism comprises a hook substantially "J" shaped.

4. An anti-theft device for a vehicle steering wheel having an outer circular rim, the device comprising:

a first semicircular casing having a first arcuate portion;

a first inwardly curving lip disposed around the first arcuate portion;

a second semicircular casing having a second arcuate portion;

a second inwardly curving lip disposed around the second arcuate portion;

a first hook mechanism slidably engaged within the first semicircular casing;

a second hook mechanism slidably engaged within the second semicircular casing;

a radial bar member having a first end and a second end;

the first radial bar member end being removably connected to the first semicircular casing;

the second radial bar member end extending through the second semi circular casing and extending a predetermined distance beyond the second arcuate portion;

a locking mechanism connected to the second semicircular casing;

the locking mechanism engagable with the radial bar member.

* * * * *